United States Patent
Meng

(10) Patent No.: US 8,929,006 B2
(45) Date of Patent: Jan. 6, 2015

(54) PIVOTALLY CONNECTED STRUCTURE ALLOWING LENS REPLACEMENT AND LENS ANGLE ADJUSTMENT

(71) Applicant: Tien-Pei Meng, Taipei (TW)

(72) Inventor: Tien-Pei Meng, Taipei (TW)

(*) Notice: Subject to any disclaimer, the term of this patent is extended or adjusted under 35 U.S.C. 154(b) by 215 days.

(21) Appl. No.: 13/775,321

(22) Filed: Feb. 25, 2013

(65) Prior Publication Data
US 2014/0240857 A1 Aug. 28, 2014

(51) Int. Cl.
*G02B 7/02* (2006.01)

(52) U.S. Cl.
CPC ........................................ *G02B 7/02* (2013.01)
USPC .......................................................... 359/827

(58) Field of Classification Search
CPC ........................................................ G02B 7/02
USPC .................................................. 359/827–830
See application file for complete search history.

(56) References Cited

U.S. PATENT DOCUMENTS

| | | | |
|---|---|---|---|
| 5,644,441 A * | 7/1997 | Hirasaki et al. | 359/828 |
| 2007/0171548 A1* | 7/2007 | Kulakofsky et al. | 359/808 |

* cited by examiner

*Primary Examiner* — Thomas K Pham
*Assistant Examiner* — Vipin Patel
(74) *Attorney, Agent, or Firm* — Bacon & Thomas, PLLC

(57) ABSTRACT

The present invention is to provide a pivotally connected structure, which includes a positioning frame having one end threadedly connectable with a front side of a camera lens; a pivotally connecting frame having one end pivotally connectable with the other end of the positioning frame, and provided therein with a receiving space which is configured for receiving a lens (e.g., protective lens, ND filter, or polarizer); and an engaging frame having one end provided with a pressing ring and having an outer periphery formed with a second curved surface which is pivotally connectable with a first curved surface provided within the other end of the pivotally connecting frame; such that the pressing ring presses against the periphery of the lens and thereby positions the lens in the receiving space, and the angle of the lens with respect to the camera lens can be adjusted by rotating the pivotally connecting frame.

14 Claims, 5 Drawing Sheets

PIVOTALLY CONNECTED STRUCTURE ALLOWING LENS REPLACEMENT AND LENS ANGLE ADJUSTMENT

FIELD OF THE INVENTION

The present invention relates to a pivotally connected structure, more particularly to a pivotally connected structure allowing lens replacement and angle adjustment at a front side of a camera lens, such that a lens (e.g., a protective lens, an ND filter, or a polarizer) can be easily positioned in a receiving space of the pivotally connected structure, and the angle of the lens with respect to the camera lens can be adjusted simply by rotating a pivotally connecting frame of the pivotally connected structure.

BACKGROUND OF THE INVENTION

Recently, with the improvement of people's living standards and significant advancements in digital technologies and optical technologies, cameras are having more and more powerful functions and are available at increasingly lower prices. As a result, a photography trend has developed in which people are getting into the habit of recording their daily lives with cameras.

Generally, a camera lens can be additionally connected with a protective lens for protective purposes, or with neutral density filters (ND filters) or polarizing lenses (polarizers) of various specifications in order to apply the desired photographic effects to the images taken. The aforesaid protective lenses, ND filters, and polarizers (hereinafter collectively referred to as lens elements) are typically designed as individual units, each including a mounting frame and a lens mounted therein, so that a user can mount the lenses of such lens elements to the front side of a camera lens through the mounting frames. However, as each mounting frame and the lens therein form an integral unit and are not designed to be separated from each other with ease, if it is possible at all, the need to carry a plurality of lens elements around presents a problem, simply considering the large storage space required. Moreover, the purchase of a plurality of lens elements is definitely more costly than that of only the lenses therein.

According to the above, the traditional lens elements have large physical volumes, are difficult to carry due to their inseparable mounting frame-and-lens configurations, and incur high purchase costs. These cause huge problems to professional photographers in particular, who are required by profession to carry a lot of photographic equipment with them. Therefore, the issue to be addressed by the present invention is to design a lens element which is more structurally simple, more compact in size, less expensive, and more convenient to use, thereby overcoming the aforesaid drawbacks of the prior art.

BRIEF SUMMARY OF THE INVENTION

In view of the fact that existing lens elements (e.g., ND filters and polarizers of various specifications and protective lenses) occupy considerable space in a photographer's camera bags and are not as easily portable as desired, the inventor of the present invention conducted extensive research and experiment and finally succeeded in developing a pivotally connected structure allowing lens replacement and lens angle adjustment as disclosed herein. The present invention effectively solves the aforementioned problems and can provide consumers with better options.

The first object of the present invention is to provide a pivotally connected structure allowing lens replacement and lens angle adjustment. The pivotally connected structure not only makes it possible to replace lenses (e.g., protective lenses, ND filters, and polarizers) arbitrarily, but also can be rapidly connected to the front side of a camera lens. The pivotally connected structure includes a positioning frame, a pivotally connecting frame, and an engaging frame. The positioning frame is a hollow circular frame. One end of the positioning frame is provided with a positioning ring which protrudes in an axial direction of the positioning frame. The positioning ring is threadedly connectable with a camera lens so as to position the positioning frame on the front side of the camera lens. The positioning frame also has an inner periphery which is adjacent to the other end of the positioning frame and provided with a pivotally connecting groove. The pivotally connecting frame is a hollow circular frame, too. One end of the pivotally connecting frame is provided with a pivotally connecting ring which protrudes in an axial direction of the pivotally connecting frame. The outer periphery of the pivotally connecting ring is provided with a pivotally connecting flange. The pivotally connecting flange and the pivotally connecting groove can engage, and pivotally connect, with each other. The pivotally connecting frame is provided therein with a receiving space which corresponds in position to the hollow portion of the pivotally connecting frame and which is configured for receiving a lens (e.g., a protective lens, an ND filter, or a polarizer) mounted therein. The other end of the pivotally connecting frame is provided with a first engaging ring which protrudes in the axial direction of the pivotally connecting frame. The inner periphery of the first engaging ring is formed with a first curved surface which extends in an axial direction of the first engaging ring, wherein the inner diameter of the first engaging ring is greater than an inner diameter of the pivotally connecting frame that corresponds to the receiving space, thus allowing the lens to pass through the first engaging ring and be mounted in the receiving space. The engaging frame is also a hollow circular frame. One end of the engaging frame is provided with a pressing ring which protrudes inward in a radial direction of the engaging frame. The outer periphery of the engaging frame is formed with a second curved surface which extends in an axial direction of the engaging frame. The second curved surface and the first curved surface can engage, and pivotally connect, with each other so that the pressing ring presses against the periphery of the lens and thereby positions the lens in the receiving space. The other end of the engaging frame is provided with a second engaging ring which protrudes outward in the radial direction of the engaging frame. The second engaging ring is designed to press against the periphery of the first engaging ring. Once the pivotally connected structure of the present invention is mounted to the front side of the camera lens, the angle of the lens with respect to the camera lens can be adjusted simply by rotating the pivotally connecting frame. This allows the user to adjust the optical filtering effect of the lens according to the photographing environment.

The second object of the present invention is to provide the foregoing pivotally connected structure, wherein the first curved surface and the second curved surface, though pivotally connected to each other, are spaced by a predetermined spacing. The predetermined spacing is so designed that, when the engaging frame is pressed by the user, the engaging frame is elastically deformed and brought into a state in which the engaging frame is no longer pivotally connected with the pivotally connecting frame and is detachable therefrom. When it is desired to replace the lens (e.g., with a protective lens, an ND filter, or a polarizer), the user only has to press the outer periphery of the engaging frame to deform the engaging frame elastically, and the engaging frame can be detached from the pivotally connecting frame. Once the original lens is removed and replaced, the engaging frame is once again engaged with the pivotally connecting frame, which concludes the lens replacement operation. Since none of the original lens and the replacement lenses is fixed in a metal frame as the conventional protective lenses, ND filters, and polarizers, not only can lenses of different design specifications for use in the present invention be stored in a small space in a camera case to meet a professional photographer's needs, but also the purchase costs of those lenses will be substantially reduced.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
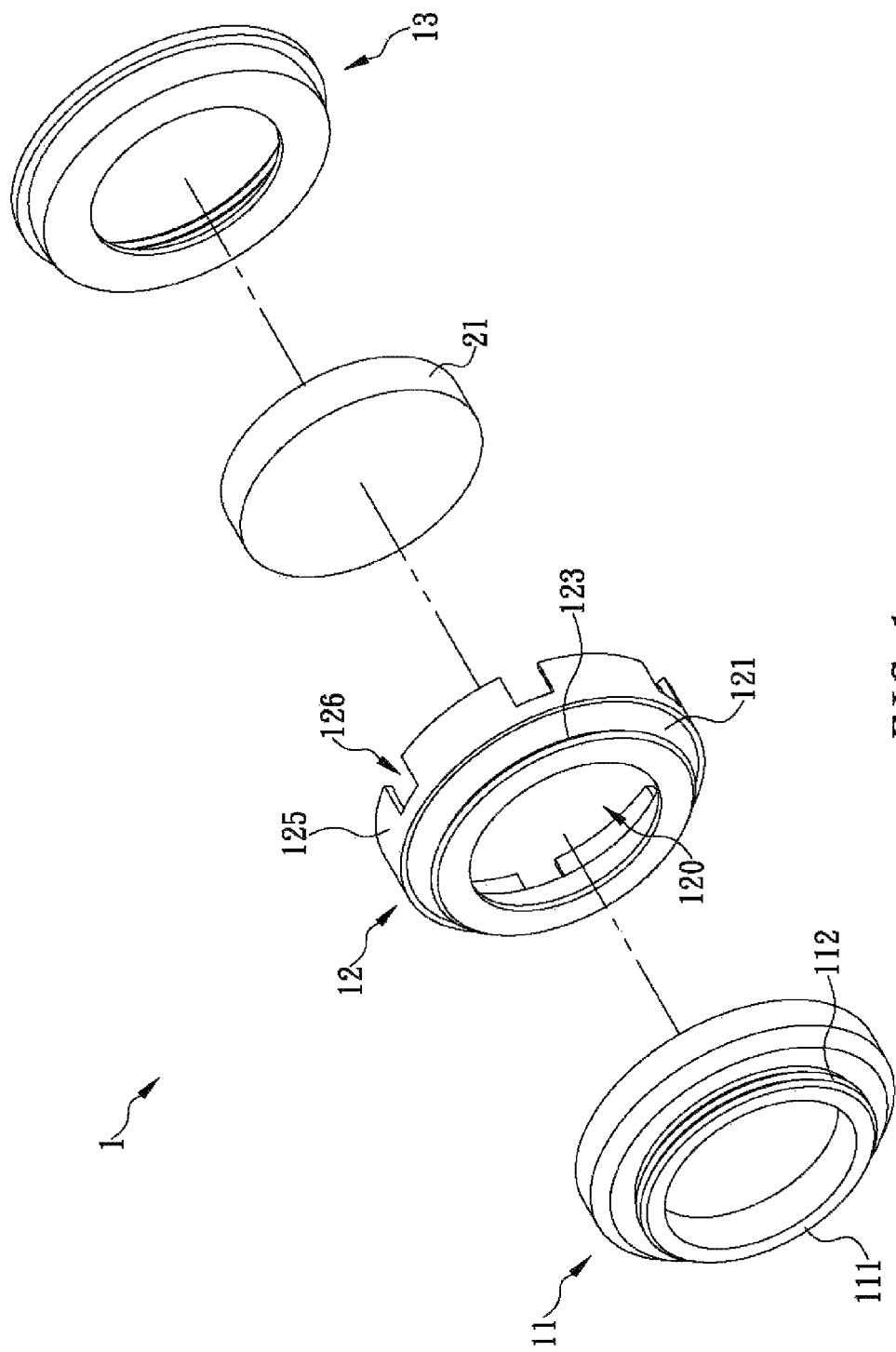
FIG. 1 is an exploded perspective view of a pivotally connected structure according to the present invention.
Figure 2:
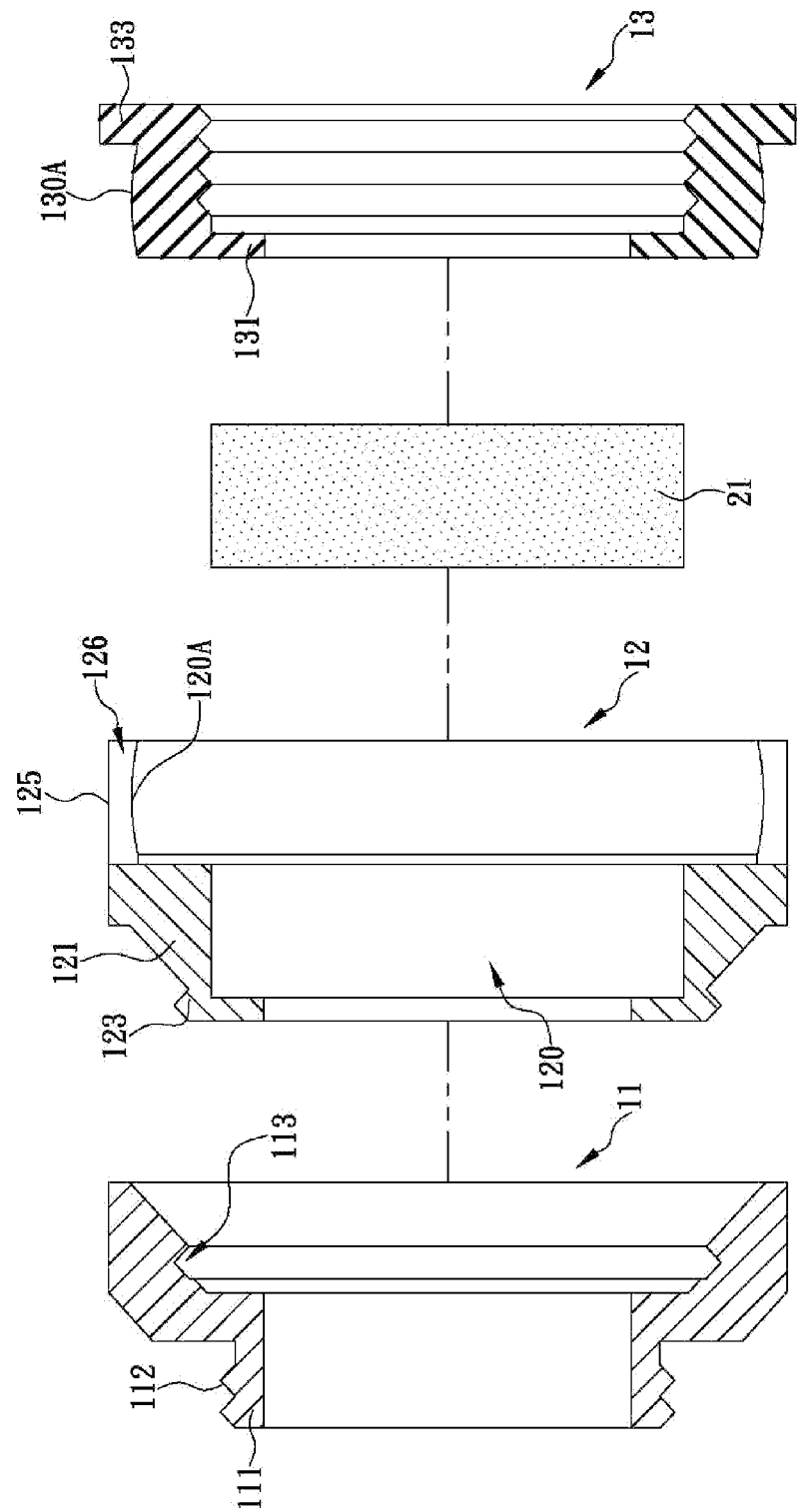
FIG. 2 is an exploded sectional view of the pivotally connected structure shown in FIG. 1.
Figure 3:
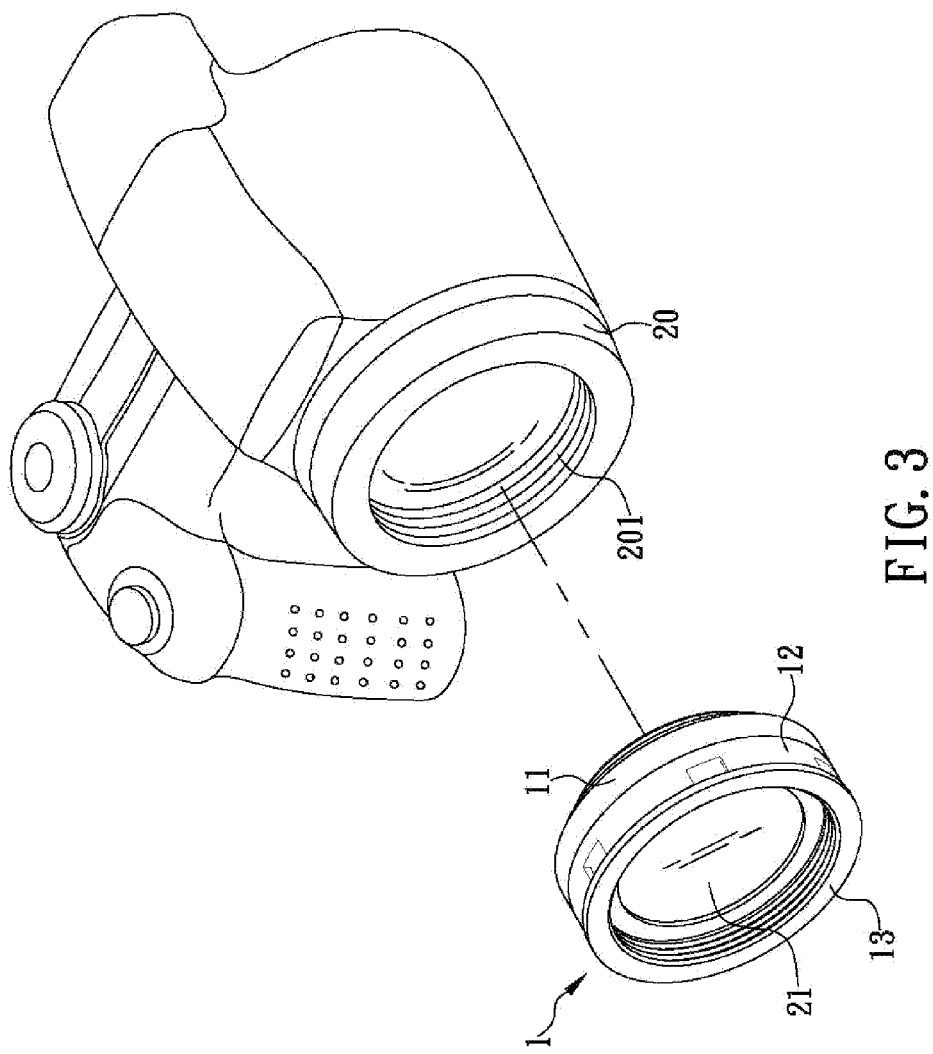
FIG. 3 is an exploded perspective view showing how the pivotally connected structure shown in FIG. 1 is mounted to a camera.

The present invention discloses a pivotally connected structure allowing lens replacement and lens angle adjustment. Referring to FIG. 1 and FIG. 2, the pivotally connected structure 1 includes a positioning frame 11, a pivotally connecting frame 12, and an engaging frame 13. In order for the pivotally connected structure 1 in this embodiment to be rapidly connectable to a camera lens 20 (see FIG. 3) and operate smoothly, the positioning frame 11, the pivotally connecting frame 12, and the engaging frame 13 are all hollow circular frames and are configured as follows. One end of the positioning frame 11 is provided with a positioning ring 111 which protrudes in an axial direction of the positioning frame 11. The outer periphery of the positioning ring 111 is provided with threads to be threadedly connected with threads 201 provided on the front side of the camera lens 20, thus allowing the positioning frame 11 to be positioned on the front side of the camera lens 20. The threaded connection also makes it easy to mount or dismount the positioning frame 11 to or from the camera lens 20.

As shown in FIG. 1 and FIG. 2, the positioning frame 11 has an inner periphery which is adjacent to the other end of the positioning frame 11 and provided with a pivotally connecting groove 113. One end of the pivotally connecting frame 12 is provided with a pivotally connecting ring 121 which protrudes in an axial direction of the pivotally connecting frame 12. The outer periphery of the pivotally connecting ring 121 is provided with a pivotally connecting flange 123. As the pivotally connecting frame 12 and the positioning frame 11 have elasticity attributable to their relatively thin structures, they can be deformed when subjected to a pressing force and resume their original shapes once the pressing force is removed. The elasticity and deformability of the pivotally connecting frame 12 and of the positioning frame 11 enable the pivotally connecting flange 123 and the pivotally connecting groove 113 to engage, and pivotally connect, with each other (see FIG. 4). Normally, a user would rotate the pivotally connecting frame 12 without pressing it forcibly; therefore, the pivotally connecting frame 12 is allowed to stay pivotally connected to the positioning frame 11 and will not separate from the positioning frame 11 accidentally during use.

Referring again to FIG. 1 and FIG. 2, the pivotally connecting frame 12 is provided therein with a receiving space 120 which corresponds in position to the hollow portion of the pivotally connecting frame 12 and which is configured for receiving a lens 21 (e.g., a protective lens, an ND filter, or a polarizer) mounted therein. The other end of the pivotally connecting frame 12 is provided with a first engaging ring 125 which protrudes in the axial direction of the pivotally connecting frame 12. The first engaging ring 125 has an inner periphery formed with a first curved surface 120A, wherein the first curved surface 120A extends in an axial direction of the first engaging ring 125 and wherein the inner diameter of the first engaging ring 125 is greater than an inner diameter of the pivotally connecting frame 12 that corresponds to the receiving space 120. As such, the lens 21 can pass through the first engaging ring 125 and be mounted in the receiving space 120 in such a way that the lens 21 is pressed against the pivotally connecting ring 121. One end of the engaging frame 13 is provided with a pressing ring 131 which protrudes inward in a radial direction of the engaging frame 13. The outer periphery of the engaging frame 13 is formed with a second curved surface 130A which extends in an axial direction of the engaging frame 13. The engaging frame 13 also has a relatively thin structure and is hence elastic, meaning the engaging frame 13 can be deformed when pressed and resume its original shape when no longer pressed. The elasticity and deformability of the engaging frame 13 and of the pivotally connecting frame 12 enable the second curved surface 130A and the first curved surface 120A to engage, and pivotally connect, with each other. The pressing ring 131 will directly press against the periphery of the lens 21, thereby fixing the lens 21 in the receiving space 120. The other end of the engaging frame 13 is provided with a second engaging ring 133 which protrudes outward in the radial direction of the engaging frame 13. The second engaging ring 133 is configured to press against the periphery of the first engaging ring 125 (see FIG. 4) so that the positioning frame 11, the pivotally connecting frame 12, and the engaging frame 13 form a single unit, allowing the pivotally connected structure 1 to be mounted to the front side of the camera lens 20 rapidly. A user only has to rotate the pivotally connecting frame 12, and the angle of the lens 21 with respect to the camera lens 20 can be adjusted to produce the desired optical filtering effect for the photographing environment. Further, as a certain amount of friction must exist between the pivotally connecting flange 123 and the pivotally connecting groove 113, which are engaged, and pivotally connected, with each other thanks to the elasticity and deformability of the positioning frame 11 and of the pivotally connecting frame 12, the lens 21, once adjusted to the desired angle, is unlikely to move away from the desired angle should the camera be shaken. This effectively increases the stability of the optical filtering effect, as well as the convenience of use, of the lens 21.

Figure 4:
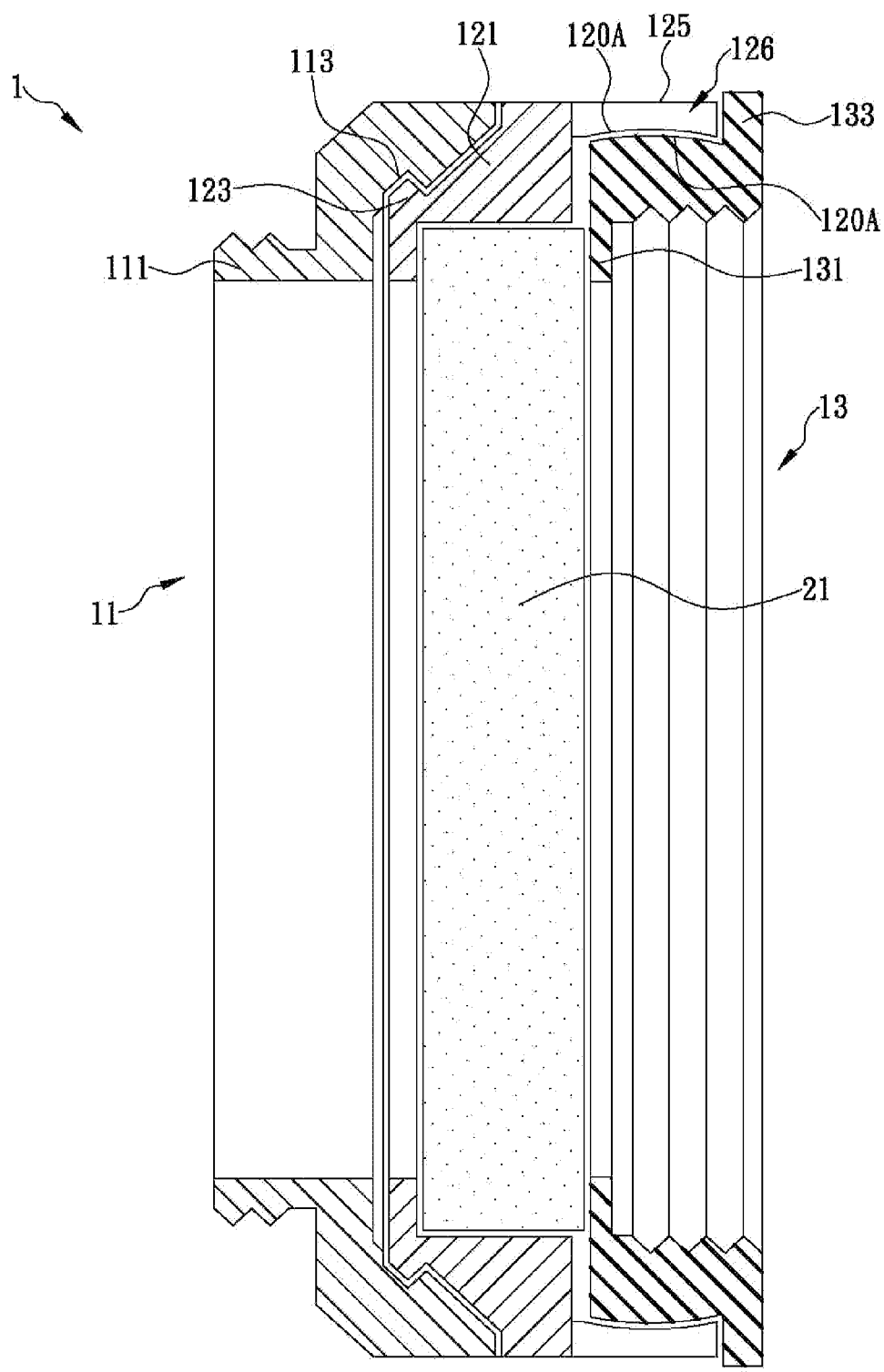
FIG. 4 is an assembled sectional view of the pivotally connected structure shown in FIG. 1.

In addition, referring to FIG. 1 and FIG. 2, while the first curved surface 120A and the second curved surface 130A of the present invention are pivotally connected to each other, a predetermined spacing remains therebetween (see FIG. 4).

The predetermined spacing allows the engaging frame 13 to enter, upon elastic deformation by a pressing force applied thereto, a state in which it is no more pivotally connected to and can be detached from the pivotally connecting frame 12. Thus, when it is desired to replace the lens 21 with another lens (e.g., a protective lens, an ND filter, or a polarizer), the user only has to press the outer periphery of the engaging frame 13 until the engaging frame 13 is elastically deformed, and the engaging frame 13 can be detached from the pivotally connecting frame 12 to enable removal of the original lens 21 and mounting of a replacement lens 21. Once the replacement lens 21 is in place, the engaging frame 13 is re-engaged with the pivotally connecting frame 12, and the mounting of the replacement lens 21 is completed. Since the lenses (including replacement lenses) 21 for use in the present invention are unlike the conventional protective lenses, ND filters, and polarizers in that they are not fixed in metal frames, a small space in a camera case will be enough for storing the lenses 21, whose design specifications may vary as desired. Thus, not only can a professional photographer's needs be met, but also the expenses of buying the lenses 21 will be substantially lowered.

To make it even easier to assemble the pivotally connected structure 1, referring to FIG. 1 and FIG. 2, the first engaging ring 125 in the illustrated embodiment is further formed with slots 126 to increase elastic deformation of the pivotally connecting frame 12. Moreover, while a certain amount of friction exists between the pivotally connecting frame 12 and the engaging frame 13 in this embodiment, additional features may be provided to ensure that the engaging frame 13 will rotate with the pivotally connecting frame 12 during use, as demonstrated by the second preferred embodiment of the present invention shown in FIG. 5, in which the same elements as those in the first preferred embodiment are identified by the same reference numerals. The first engaging ring 125A is provided with at least one first engaging portion 127 having a recessed structure (e.g., formed as a cavity) or a projecting structure (e.g., formed as a tenon). The second engaging ring 133A, on the other hand, is provided with at least one second engaging portion 135 having a projecting structure (e.g., formed as a tenon) or a recessed structure (e.g., formed as a cavity). The at least one second engaging portion 135 is engageable with the at least one first engaging portion 127 so that, when the pivotally connecting frame 12 is rotated, the engagement between the engaging portions 127 and 135 prevents the engaging frame 13 from rotating relative to the pivotally connecting frame 12; consequently, enhanced convenience of use is provided. In other embodiments of the present invention, however, the configurations of the engaging portions 127 and 135 may vary according to design requirements. For example, each first engaging portion 127 may be a tenon while each second engaging portion 135 is a cavity. Furthermore, a washer 14, which is a hollow circular pad, is pressed against the periphery of the pressing ring 131. When the engaging frame 13 is engaged with the pivotally connecting frame 12, the washer 14 is pressed also against the periphery of a polarizer 21A such that the polarizer 21A is indirectly pressed by the pressing ring 131 and is thereby positioned in the receiving space 120. The washer 14 serves to protect the polarizer 21A from wear.

Figure 5:
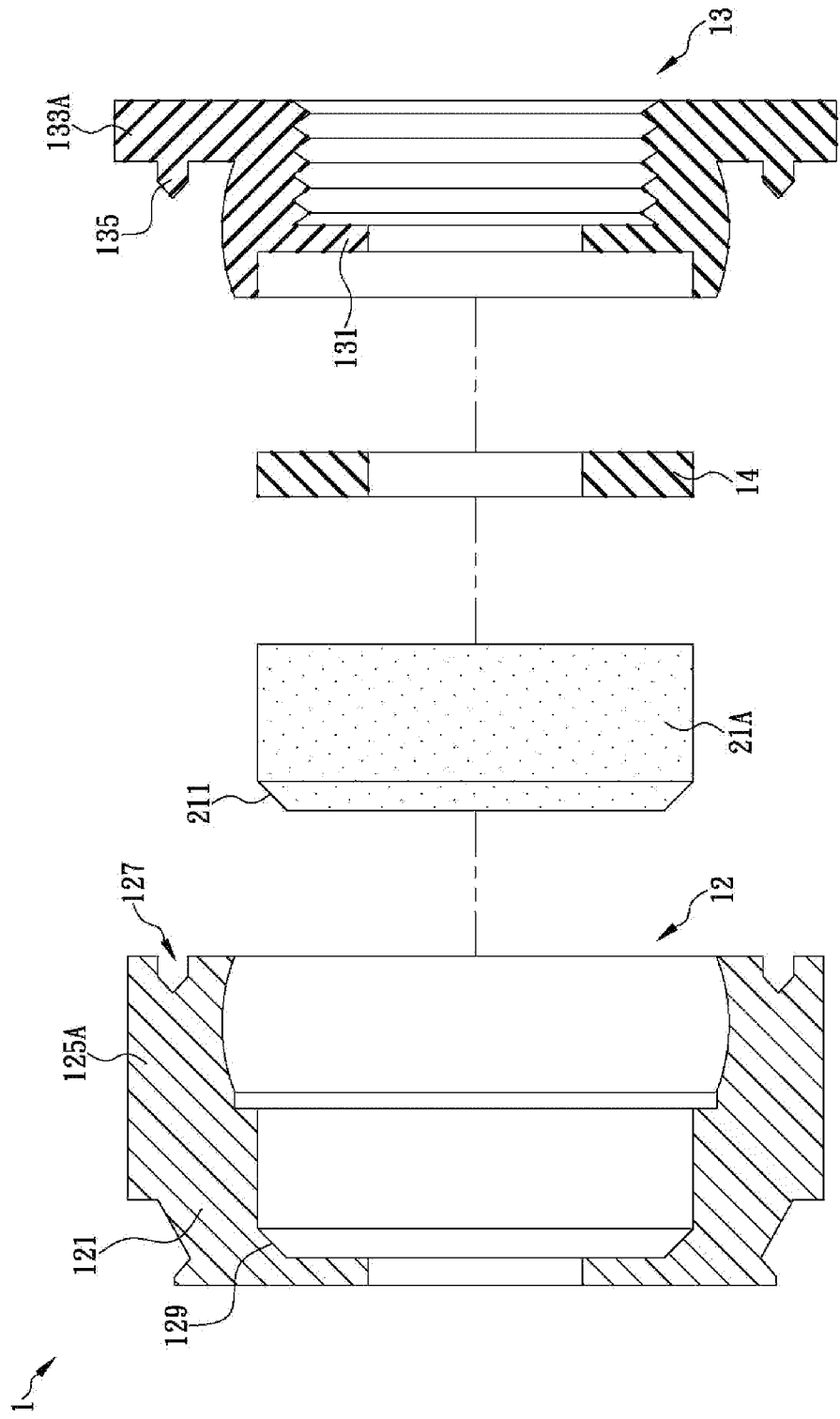
FIG. 5 is a partial exploded sectional view of another pivotally connected structure according to the present invention, in which a polarizer is used.

Additionally, referring to FIG. 5, as certain polarizers (such as the polarizer 21A in FIG. 5) must be used in their respective fixed orientations, a first foolproof structure 129 (e.g., a cavity) is provided on the pivotally connecting frame 12 at a position adjacent to the receiving space 120, so as for the pivotally connected structure 1 to fix such a polarizer in a predetermined direction. The first foolproof structure 129 is configured for engaging with a second foolproof structure 211 (e.g., a tenon) provided on the polarizer 21A, i.e., a polarizer having a specific direction during use (e.g., a circular polarizing filter; CPL). Thus, it can be guaranteed that the polarizer 21A will stay in the correct polarization direction once positioned in the receiving space 120. In another embodiment of the present invention, however, the lens to be used may require the first foolproof structure 129 to be a tenon instead. Therefore, the first foolproof structure 129 and the second foolproof structure 211 may vary in configuration, provided that they match each other. Besides, it is feasible to have the first foolproof structure 129 disposed on the engaging frame 13.

While the invention herein disclosed has been described by means of specific embodiments, numerous modifications and variations could be made thereto by those skilled in the art without departing from the scope of the invention set forth in the claims.

What is claimed is:

1. A pivotally connected structure allowing lens replacement and lens angle adjustment, comprising:

a positioning frame formed as a hollow circular frame, the positioning frame having an end provided with a positioning ring protruding in an axial direction of the positioning frame, the positioning ring having an outer periphery provided with threads threadedly connectable with threads provided on a front side of a camera lens, so as to position the positioning frame on the front side of the camera lens, the positioning frame having an inner periphery which is adjacent to an opposite end of the positioning frame and is provided with a pivotally connecting groove;

a pivotally connecting frame formed as a hollow circular frame, the pivotally connecting frame having an end provided with a pivotally connecting ring protruding in an axial direction of the pivotally connecting frame, the pivotally connecting ring having an outer periphery provided with a pivotally connecting flange, wherein the pivotally connecting flange and the pivotally connecting groove are engageable, and pivotally connectable, with each other due to elasticity and deformability of the pivotally connecting frame and of the positioning frame, the pivotally connecting frame being provided therein with a receiving space corresponding in position to a hollow portion of the pivotally connecting frame, the receiving space being configured for receiving a lens mounted therein, the pivotally connecting frame having an opposite end provided with a first engaging ring protruding in the axial direction of the pivotally connecting frame, the first engaging ring having an inner periphery formed with a first curved surface extending in an axial direction of the first engaging ring, the first engaging ring having an inner diameter greater than an inner diameter of the pivotally connecting frame that corresponds to the receiving space; and an engaging frame formed as a hollow circular frame, the engaging frame having an end provided with a pressing ring protruding inward in a radial direction of the engaging frame, the engaging frame having an outer periphery formed with a second curved surface extending in an axial direction of the engaging frame, wherein the second curved surface and the first curved surface are engageable, and pivotally connectable, with each other due to elasticity and deformability of the engaging frame and of the pivotally connecting frame, so as for the pressing ring to directly press against a periphery of the lens or press the periphery of the lens indirectly, thereby positioning the lens in the receiving space, the engaging frame having an opposite end provided with a second engaging ring protruding outward in the radial direction of the engaging frame, the second engaging ring being configured for pressing against a periphery of the first engaging ring.

2. The pivotally connected structure of claim 1, further comprising a washer, the washer being formed as a hollow circular pad and located between the pressing ring and the periphery of the lens such that the pressing ring presses the periphery of the lens indirectly.

3. The pivotally connected structure of claim 1, wherein the first curved surface and the second curved surface are spaced by a predetermined spacing so that the engaging frame, when pressed, is elastically deformed, is released from rotatable connection with the pivotally connecting frame, and is detachable from the pivotally connecting frame.

4. The pivotally connected structure of claim 2, wherein the first curved surface and the second curved surface are spaced by a predetermined spacing so that the engaging frame, when pressed, is elastically deformed, is released from rotatable connection with the pivotally connecting frame, and is detachable from the pivotally connecting frame.

5. The pivotally connected structure of claim 3, wherein the first engaging ring is formed with a plurality of slots which extend in the axial direction of the first engaging ring, are distributed at equal intervals along a circumferential direction of the first engaging ring, and serve to increase elastic deformation of the first engaging ring.

6. The pivotally connected structure of claim 4, wherein the first engaging ring is formed with a plurality of slots which extend in the axial direction of the first engaging ring, are distributed at equal intervals along a circumferential direction of the first engaging ring, and serve to increase elastic deformation of the first engaging ring.

7. The pivotally connected structure of claim 5, wherein the first engaging ring is provided with at least one first engaging portion, and the second engaging ring is provided with at least one second engaging portion engageable with the at least one first engaging portion to prevent the engaging frame from rotating relative to the pivotally connecting frame.

8. The pivotally connected structure of claim 6, wherein the first engaging ring is provided with at least one first engaging portion, and the second engaging ring is provided with at least one second engaging portion engageable with the at least one first engaging portion to prevent the engaging frame from rotating relative to the pivotally connecting frame.

9. The pivotally connected structure of claim 7, wherein each said first engaging portion has a recessed or projecting structure, and each said second engaging portion has a projecting or recessed structure so that the at least one second engaging portion is engageable with the at least one first engaging portion to prevent the engaging frame from rotating relative to the pivotally connecting frame.

10. The pivotally connected structure of claim 8, wherein each said first engaging portion has a recessed or projecting structure, and each said second engaging portion has a projecting or recessed structure so that the at least one second engaging portion is engageable with the at least one first engaging portion to prevent the engaging frame from rotating relative to the pivotally connecting frame.

11. The pivotally connected structure of claim 5, wherein the pivotally connecting frame or the engaging frame is provided with a first foolproof structure adjacent to the receiving space, the first foolproof structure being engageable with a second foolproof structure provided on a polarizing lens which must be used in a specific orientation.

12. The pivotally connected structure of claim 6, wherein the pivotally connecting frame or the engaging frame is provided with a first foolproof structure adjacent to the receiving space, the first foolproof structure being engageable with a second foolproof structure provided on a polarizing lens which must be used in a specific orientation.

13. The pivotally connected structure of claim 11, wherein the first foolproof structure is a tenon or a cavity, and the second foolproof structure is a cavity or a tenon.

14. The pivotally connected structure of claim 12, wherein the first foolproof structure is a tenon or a cavity, and the second foolproof structure is a cavity or a tenon.

* * * * *